United States Patent [19]
Grenot

[11] Patent Number: 5,381,410
[45] Date of Patent: Jan. 10, 1995

[54] TRANSIT SWITCH FOR AN ASYNCHRONOUS NETWORK, NOTABLY AN ATM NETWORK

[75] Inventor: Thierry Grenot, Clamart, France

[73] Assignee: Thomson-CSF, Puteaux, France

[21] Appl. No.: 73,612

[22] Filed: Jun. 8, 1993

Related U.S. Application Data

[63] Continuation of Ser. No. 805,036, Dec. 11, 1991, abandoned.

[30] Foreign Application Priority Data

Dec. 20, 1990 [FR] France .................... 90 15998

[51] Int. Cl.⁶ ........................... H04Q 11/04
[52] U.S. Cl. ...................... 370/60.1; 370/94.1
[58] Field of Search ............ 370/94.1, 94.2, 60, 370/60.1, 85.1, 85.2, 85.13, 67, 124

[56] References Cited

U.S. PATENT DOCUMENTS

| | | | |
|---|---|---|---|
| 4,445,213 | 4/1984 | Baugh et al. | 370/60 |
| 4,821,259 | 4/1989 | DeBruler et al. | 370/60 |
| 4,862,451 | 8/1989 | Closs et al. | 370/60 |
| 4,933,938 | 6/1990 | Sheehy | 370/85.13 |

FOREIGN PATENT DOCUMENTS

| | | |
|---|---|---|
| 904100 | 7/1986 | Belgium . |
| 0126196 | 11/1984 | European Pat. Off. . |

*Primary Examiner*—Benedict V. Safourek
*Assistant Examiner*—Ajit Patel
*Attorney, Agent, or Firm*—Oblon, Spivak, McClelland, Maier, & Neustadt

[57] ABSTRACT

A transit switch of an asynchronous network, notably an ATM network, for the handling of information elements in the form of packets having a header part for the identification of a destination and a information element part, having a plurality of input junctors supplied with packets by a plurality of associated input channels, there are also a plurality of output junctors connected to the input junctors by a synchronous bus, a bus allocator circuit is connected to the input junctors and to the bus. The switch is arranged so that each input junctor transfers a received packet to at least one output junctor which is identified from the header part of the packet to be transferred.

1 Claim, 1 Drawing Sheet

TRANSIT SWITCH FOR AN ASYNCHRONOUS NETWORK, NOTABLY AN ATM NETWORK

This application is a continuation of application Ser. No. 07/805,036, filed on Dec. 11, 1991, now abandoned.

BACKGROUND OF THE INVENTION

1. Field of the Invention

The invention relates to a transit switch for a fast communications network by packets using the technique of asynchronous transmission, notably an ATM (asynchronous transmission mode) type of asynchronous network.

A fast communications system using packets (or cells as they are also called in ATM terminology) has a plurality of switches connected to one another by high bit-rate arteries, the switches connecting a plurality of end terminals. The different types of network switches include end switches that are directly connected to the end terminals in which the packets are shaped out of the signals generated by sender terminals, and switches known as transit switches in which the shaped packets, having travelled in transit through arteries of the network, are handled and then shunted towards one or more transit or end switches.

2. Description of the Prior Art

In the end switches, the packets are shaped so as to be constituted by a header part and an information element part. The header part identifies a destination terminal towards which the information elements contained in the packet in question have to be conveyed. The packets constituted in an end switch are then transferred through an artery to a transit switch that is connected to a plurality of packet emitting channels and to a plurality of packet receiving channels. It will be understood that the transit switches form the core of the network and that, consequently, they must meet the very strict criteria of speed, reliability and modularity. It is also possible to conceive of switches having the dual function of end switches and transit switches.

SUMMARY OF THE INVENTION

An object of the invention is to propose a transit switch that enables the automatic and swift handling of the packets that arrive by the emitter channels to transfer them to the receiver channels in order to convey each packet received at one end of the network to another end of the network. Another object of the invention is to propose a transit switch such as this that is easy to make and implements a known technology.

To this effect, the invention proposes a transit switch of an asynchronous network, notably an ATM network, for the handling of information elements in the form of packets having a header part for the identification of a destination and a information element part wherein said switch comprises:

a plurality of input junctors to receive packets coming from associated input channels;

a plurality of output junctors connected to the input junctors by a synchronous bus and to output channels to transfer a packet from an input channel to at least one output channel through the synchronous bus;

said input junctors being furthermore controlled by a means for the allocation of the synchronous bus to emit a packet on the bus and said output junctors being permanently receptive to information elements generated by the input junctors to take said packet to the bus only in response to a particular marker information element.

BRIEF DESCRIPTION OF THE DRAWING

Other features and advantages of the invention shall appear more clearly from the following description of a preferred embodiment of the invention, given purely by way of an example and made with reference to the appended drawing wherein.

DESCRIPTION OF THE PREFERRED EMBODIMENT

Figure 1:
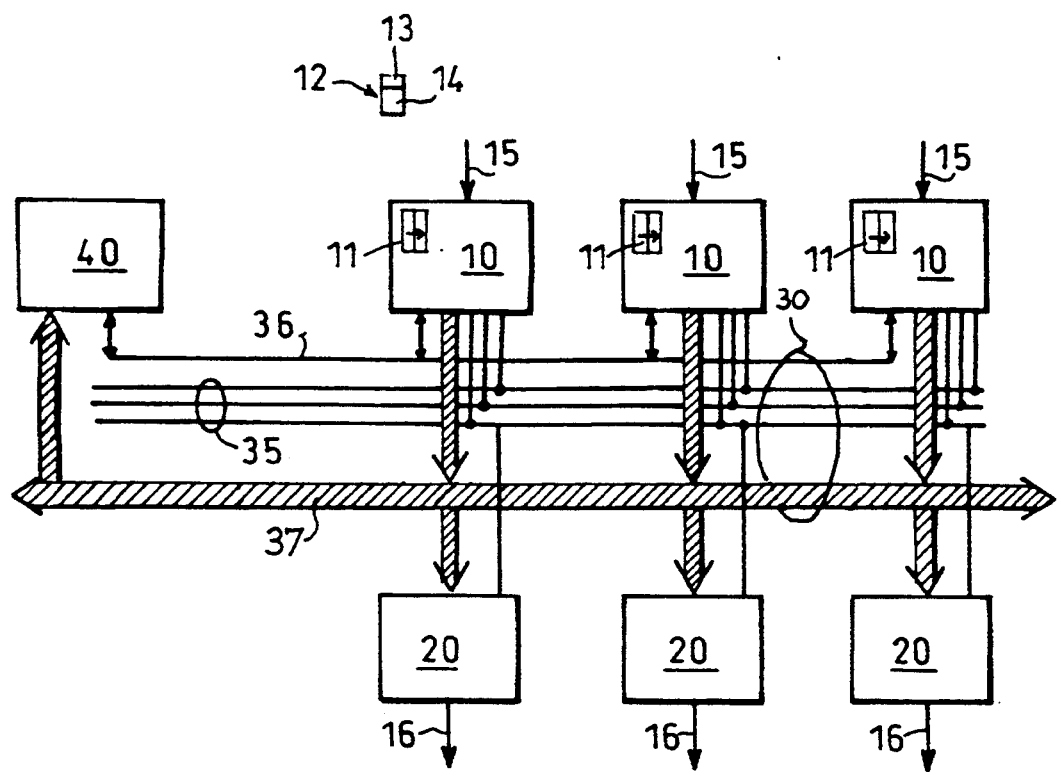
FIG. 1 is a schematic drawing of the structure of a transit switch according to the invention.

In FIG. 1, the transit switch is built around a bus 30 that interconnects a plurality of input junctors 10 and a plurality of output junctors 20, only six of which have been shown. The connection of the junctors by bus gives the transit switch a great degree of modularity since the number of junctors thus connected can be easily increased or reduced.

The input junctors 10 are supplied with packets through associated emitter channels 15. These packets are sent out on output channels 16 connected to output junctors 20 associated through the bus 30, the input and output channels 15, 16 constituting the arteries of an asynchronous network such as an ATM network. The input junctors include a means for the physical matching of the input channel chosen as a function of the nature of the channel (fiber, optic cable, directional radio link etc.), a means for the recovery of the packets arriving in streams at an input channel, a means for placing these packets in a queue before they are transferred to the interconnection bus and a bus interface means. The output junctors include, for their part, a means for the matching of an output channel and a bus interface means equivalent to those of the input junctors, and a means for placing the packets in a queue before they are transferred to an output channel. These different means, which are not shown in this figure, are well known to those skilled in the art and shall not be described in greater detail here below.

It must be understood that the input junctors and output junctors are constituted around data processing mechanisms providing for an information bit rate that is appreciably higher than the rate of exchange of information in the network. Consequently, a part of the data processing mechanisms in the junctors may be controlled by a clock rate internal to the transit switch and may work in synchronous mode with the bus.

A bus allocator 40 is connected to the synchronous bus 30. The bus allocator 40 includes means (not shown) to detect activity in the synchronous bus 30 and has the function of allocating the bus to one of the input junctors 10, for example according to a principle of fixed or rotating priority, the output junctors 20, for their part, being always in a listening state with respect to the synchronous bus.

The bus allocator 40 is connected to the input junctors 10 by a specific link 36, which may or may not be incorporated into the bus. The synchronous bus allocator 40 receives requests for the allocation of the bus from the input junctors 10, through the link 36. In response to the input junctors 10 and through this specific link 36, the bus allocator 40 gives permission for access to the bus. In response to permission for access to the bus, an input junctor 10 generates a marker information element prepared beforehand from the header of a packet to be handled and a translation table 11 internal to each input junctor or common to all the input junctors. The translation table is a correspondence table with one input corresponding to one packet header. For each packet header, the translation table provides an output junctor reference (marker) and a new packet header.

Figure 2:
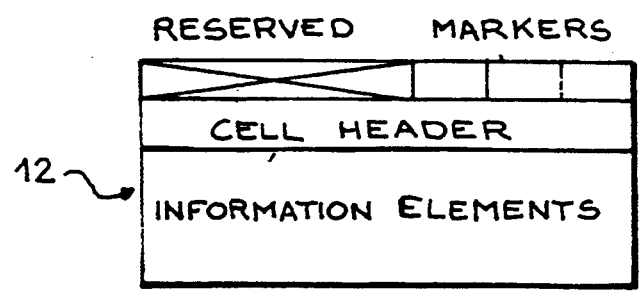
FIG. 2 shows the structure of the information handled in the transit switch according to the invention.

The output junctors 20 are each connected to a specific line 35 through which there transits the marker generated by an input junctor 10. According to the invention, the marker is a binary element, and there is one marker per output junctor. FIG. 2 gives a schematic view of the information handled by a transit switch. This information takes the form of messages that are formed by the input junctors 10 and that include a part reserved for conveying local service information to the transit switch, the markers associated with each output junctor, the header part of the packet and the information elements part of the packet. Returning to FIG. 1, each input junctor 10 is connected to three specific lines such as 35 while each output junctor 20 is connected to one specific line 35, which is different for all the output junctors. It will be understood that, through the lines 35, an input junctor may selectively activate an output junctor in generating a marker on a specific line of the output junctor, but it may also activate several output junctors or all the output junctors in generating a marker on each specific line of the output junctors in question. In the latter case, an input packet is sent out towards a plurality of output channels.

We shall now describe the working of the transit switch according to the invention when a packet 12 arrives at the input of an input junctor 10 through the input channel 15. This packet has a header part 13 indicating a destination address and an information elements part 14. In response to the reception of the packet 12, the input junctor sends a request for a bus connection to the allocator 40 of the synchronous bus 30, through the link 36, and goes into a state of waiting for a response from the allocator. As soon as the input junctor receives permission to from the allocator 40 for connection to the bus 30, it generates a marker information element prepared beforehand from the header part of the packet and from the translation table 11. The marker generated represents an output junctor 20 by which the packet should be transferred. The input junctor 10 sends the marker on a specific line 35, in a first cycle given by the clock of the switch, to activate the output junctor 20 concerned. The output junctor 20, which is still in the position of listening to its specific line 35, receives the marker and, in a second cycle, picks up the packet transferred consecutively to a part 37 of the bus by the input junctor 10. The output junctor 20, having taken the packet, sends it on its associated output channel 16. It can be seen to it that the allocation cycle for the transfer of a packet takes place during the transfer of a previous packet through the bus 20 in order to further increase the bit rate of the transit switch. Besides, it will be understood that the number of specific lines 35 is at least equal to the number of output junctors since there is one marker (binary element) per output junctor, to enable a direct transfer of the packet through the bus 30. It is also possible to provide for using a part of the bus 37 (instead of the lines 35) to convey the markers since the markers are sent out before the transfer of the packet.

Naturally, the invention is not restricted to the above exemplary embodiment, and it is possible to provide for other variants without going beyond the scope of the invention.

What is claimed is:

1. A transit switch of an asynchronous network for handling of information elements in the form of packets having a header part for identification of a destination and an information element part wherein said transit switch comprises:

a plurality of input junctors to receive packets coming from associated input channels;

a plurality of output junctors connected to the input junctors by a synchronous bus and to output channels to transfer a packet from an input channel to at least one output channel through the synchronous bus;

said plurality of input junctors comprising at least a translation table for providing at least an output junctor reference and a new packet header for each packet coming from associated input channels, a bus allocator connected to the synchronous bus for allocating the bus when the input junctors received a packet wherein each input junctor emits a request to the bus allocator each time it has to transmit a packet to an output junctor and generates a marker information element read in the translation table from the header part of the packet for transferring the packet on the output junctor pointed by the marker information.

* * * * *